US011224074B2

United States Patent
Basu Mallick et al.

(10) Patent No.: US 11,224,074 B2
(45) Date of Patent: Jan. 11, 2022

(54) BANDWIDTH PART CONFIGURATION BASED ON A CLEAR CHANNEL ASSESSMENT

(71) Applicant: Lenovo (Singapore) PTE. LTD., New Tech Park (SG)

(72) Inventors: Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 174 days.

(21) Appl. No.: 16/536,060

(22) Filed: Aug. 8, 2019

(65) Prior Publication Data
US 2020/0053797 A1    Feb. 13, 2020

Related U.S. Application Data

(60) Provisional application No. 62/715,950, filed on Aug. 8, 2018.

(51) Int. Cl.
*H04W 74/08*    (2009.01)

(52) U.S. Cl.
CPC ... *H04W 74/0833* (2013.01); *H04W 74/0808* (2013.01)

(58) Field of Classification Search
None
See application file for complete search history.

(56) References Cited

U.S. PATENT DOCUMENTS

| 2016/0226637 A1* | 8/2016 | Nory | H04L 5/0053 |
| 2016/0337869 A1* | 11/2016 | Dai | H04W 16/14 |
| 2017/0099678 A1* | 4/2017 | Dinan | H04L 27/0006 |
| 2017/0171759 A1* | 6/2017 | Li | H04W 74/0808 |
| 2017/0202018 A1* | 7/2017 | Cha | H04W 74/0816 |

(Continued)

OTHER PUBLICATIONS

3GPP RAN WG1 Meeting #92bis, R1-1804680, Sanya, China, Apr. 16-20, 2018, Agenda Item: 7.6.5, Source: InterDigital Inc., Title: BWP operation in unlicensed spectrum (Year: 2018).*
3GPP TSG RAN WG2 NR AH1807 Meeting, R2-1809841, Montreal, Canada, Jul. 2-6, 2018, Agenda Item: 11.2, Source: ZTE, Title: Considerations on channel access procedure for NR-U (Year: 2018).*

(Continued)

*Primary Examiner* — Michael J Moore, Jr.
*Assistant Examiner* — Gautam Sharma
(74) *Attorney, Agent, or Firm* — Kunzler Bean & Adamson

(57) ABSTRACT

Apparatuses, methods, and systems are disclosed for bandwidth part ("BWP") configuration based on a clear channel assessment ("CCA"). One method includes configuring at least one BWP. Each BWP of the at least one BWP comprises a downlink BWP and an uplink BWP. The method includes indicating a first BWP of the at least one BWP as an active BWP. The method includes performing a CCA prior to transmitting a message. The method includes, in response to the CCA being successful for the active BWP, transmitting the message using the active BWP. The method includes, in response to the CCA being unsuccessful for the active BWP and the CCA being successful for only a second BWP of the at least one BWP: indicating the second BWP as the active BWP; and transmitting the message using the active BWP.

20 Claims, 5 Drawing Sheets

(56) References Cited

U.S. PATENT DOCUMENTS

| | | | | |
|---|---|---|---|---|
| 2017/0280448 A1* | 9/2017 | Takeda | | H04W 16/14 |
| 2018/0049241 A1* | 2/2018 | Heo | | H04L 27/2626 |
| 2018/0213563 A1* | 7/2018 | Yang | | H04W 72/12 |
| 2018/0302926 A1* | 10/2018 | Bhorkar | | H04W 28/065 |
| 2018/0343577 A1* | 11/2018 | Takiguchi | | H04W 72/04 |
| 2018/0343639 A1* | 11/2018 | Zheng | | H04W 48/16 |
| 2019/0029054 A1* | 1/2019 | Li | | H04W 74/006 |
| 2019/0053284 A1* | 2/2019 | Wang | | H04W 16/14 |
| 2019/0124646 A1* | 4/2019 | Ly | | H04W 74/006 |
| 2019/0124687 A1* | 4/2019 | Yang | | H04L 27/0006 |
| 2019/0268883 A1* | 8/2019 | Zhang | | H04W 16/14 |
| 2019/0372706 A1* | 12/2019 | Li | | H04W 88/08 |
| 2019/0387546 A1* | 12/2019 | Li | | H04W 74/0833 |
| 2020/0053780 A1* | 2/2020 | Jia | | H04W 72/08 |
| 2020/0205020 A1* | 6/2020 | Nam | | H04W 74/006 |

OTHER PUBLICATIONS

3GPP TSG RAN WG1 Meeting #93, R1-1806459, Busan, Korea, May 21-25, 2018,Title: Discussion on frame structure for NR-U, Source: ZTE (Year: 2018).*

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

3GPP, "3rd Generation Partnership Project; Technical Specification Group Radio Access Network; NR; Multiplexing and channel coding (Release 15)", 3GPP TS 38.212 V15.2.0, Jun. 2018, pp. 1-98.

Erricsson, "Introduction of SA", 3GPP TSG-WG2 Meeting #102AH R2-1810388, Jul. 2-6, 2018, pp. 1-388.

* cited by examiner

BANDWIDTH PART CONFIGURATION BASED ON A CLEAR CHANNEL ASSESSMENT

CROSS-REFERENCE TO RELATED APPLICATIONS

This application claims priority to U.S. Patent Application Ser. No. 62/715,950 entitled "APPARATUSES, METHODS, AND SYSTEMS FOR EFFICIENTLY INCREASING DIVERSITY IN WIRELESS COMMUNICATION SYSTEMS" and filed on Aug. 8, 2018 for Prateek Basu Mallick, which is incorporated herein by reference in its entirety.

FIELD

The subject matter disclosed herein relates generally to wireless communications and more particularly relates to bandwidth part configuration based on a clear channel assessment.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Positive-Acknowledgment ("ACK"), Aggregation Level ("AL"), Access and Mobility Management Function ("AME"), Access Network ("AN"), Access Point ("AP"), Authentication Server Function ("AUSF"), Beam Failure Detection ("BED"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSP"), Channel State Information-Reference Signal ("CSI-RS"), Common Search Space ("CSS"), Control Resource Set ("CORESET"), Device-to-Device ("D2D"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Channel ("RACH"), Random Access Preamble Identity ("RAPID"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, BWPs may be used. In such networks, it may be unknown which BWP to select to use.

BRIEF SUMMARY

Methods for bandwidth part configuration based on a clear channel assessment are disclosed. Apparatuses and systems also perform the functions of the apparatus. One embodiment of a method includes configuring at least one bandwidth part. In such an embodiment, each bandwidth part of the at least one bandwidth part comprises a downlink bandwidth part and an uplink bandwidth part. In certain embodiments, the method includes indicating a first bandwidth part of the at least one bandwidth part as an active bandwidth part. In various embodiments, the method includes performing a clear channel assessment prior to transmitting a message. In some embodiments, the method includes, in response to the clear channel assessment being successful for the active bandwidth part, transmitting the message using the active bandwidth part. In certain embodiments, the method includes, in response to the clear channel assessment being unsuccessful for the active bandwidth part and the clear channel assessment being successful for only a second bandwidth part of the at least one bandwidth part: indicating the second bandwidth part as the active bandwidth part; and transmitting the message using the active bandwidth part.

One apparatus for bandwidth part configuration based on a clear channel assessment includes a processor that: configures at least one bandwidth part, wherein each bandwidth part of the at least one bandwidth part comprises a downlink bandwidth part and an uplink bandwidth part; indicates a first bandwidth part of the at least one bandwidth part as an active bandwidth part; and performs a clear channel assessment prior to transmitting a message. In some embodiments, the apparatus includes a transmitter that, in response to the clear channel assessment being successful for the active bandwidth part, transmits the message using the active bandwidth part. In various embodiments, in response to the clear channel assessment being unsuccessful for the active bandwidth part and the clear channel assessment being successful for only a second bandwidth part of the at least one bandwidth part: the processor indicates the second bandwidth part as the active bandwidth part; and the transmitter transmits the message using the active bandwidth part.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
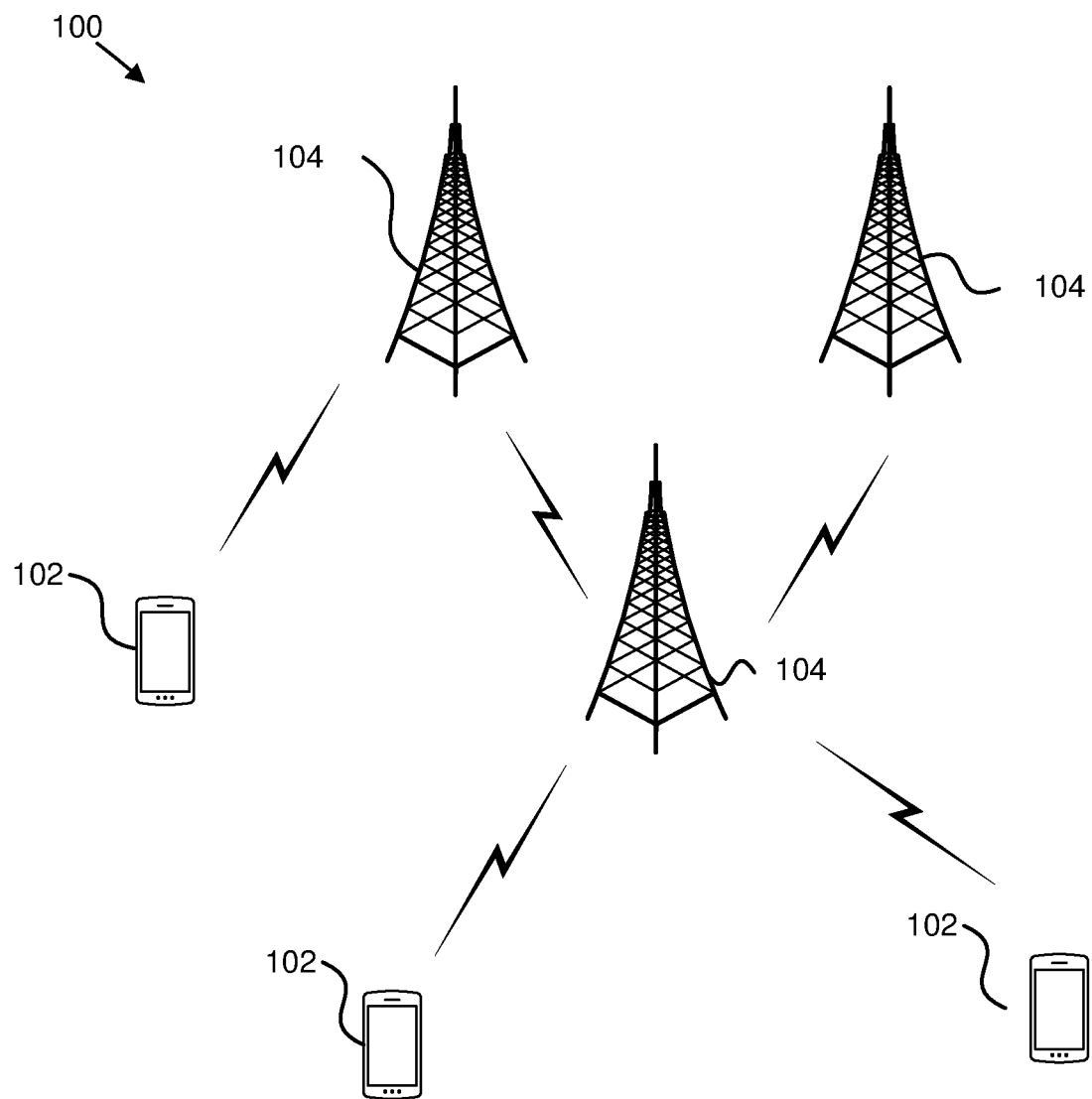
FIG. 1 is a schematic block diagram illustrating one embodiment of a wireless communication system for bandwidth part configuration based on a clear channel assessment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for bandwidth part configuration based on a clear channel assessment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may configure at least one bandwidth part. In such an embodiment, each bandwidth part of the at least one bandwidth part comprises a downlink bandwidth part and an uplink bandwidth part. In certain embodiments, the remote unit 102 may indicate a first bandwidth part of the at least one bandwidth part as an active bandwidth part. In various embodiments, the remote unit 102 may perform a clear channel assessment prior to transmitting a message. In some embodiments, the remote unit 102 may, in response to the clear channel assessment being successful for the active bandwidth part, transmit the message using the active bandwidth part. In certain embodiments, the remote unit 102 may, in response to the clear channel assessment being unsuccessful for the active bandwidth part and the clear channel assessment being successful for only a second bandwidth part of the at least one bandwidth part: indicate the second bandwidth part as the active bandwidth part; and transmit the message using the active bandwidth part. Accordingly, the remote unit 102 may be used for bandwidth part configuration based on a clear channel assessment.

Figure 2:
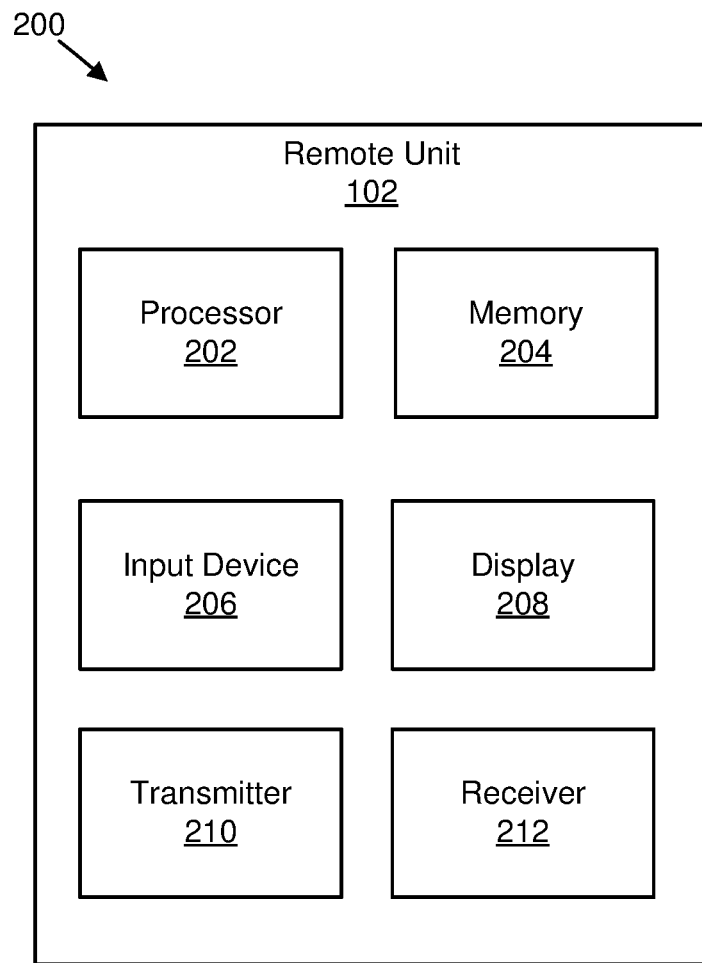
FIG. 2 is a schematic block diagram illustrating one embodiment of an apparatus that may be used for bandwidth part configuration based on a clear channel assessment.

FIG. 2 depicts one embodiment of an apparatus 200 that may be used for bandwidth part configuration based on a clear channel assessment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: configure at least one bandwidth part, wherein each bandwidth part of the at least one bandwidth part comprises a downlink bandwidth part and an uplink bandwidth part; indicate a first bandwidth part of the at least one bandwidth part as an active bandwidth part; perform a clear channel assessment prior to transmitting a message; and, in response to the clear channel assessment being unsuccessful for the active bandwidth part and the clear channel assessment being successful for only a second bandwidth part of the at least one bandwidth part, indicate the second bandwidth part as the active bandwidth part. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the transmitter may: in response to a clear channel assessment being successful for an active bandwidth part, transmit a message using the active bandwidth part; and, in response to the clear channel assessment being unsuccessful for the active bandwidth part and the clear channel assessment being successful for only a second bandwidth part of at least one bandwidth part: transmit the message using the second bandwidth part as the active bandwidth part.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
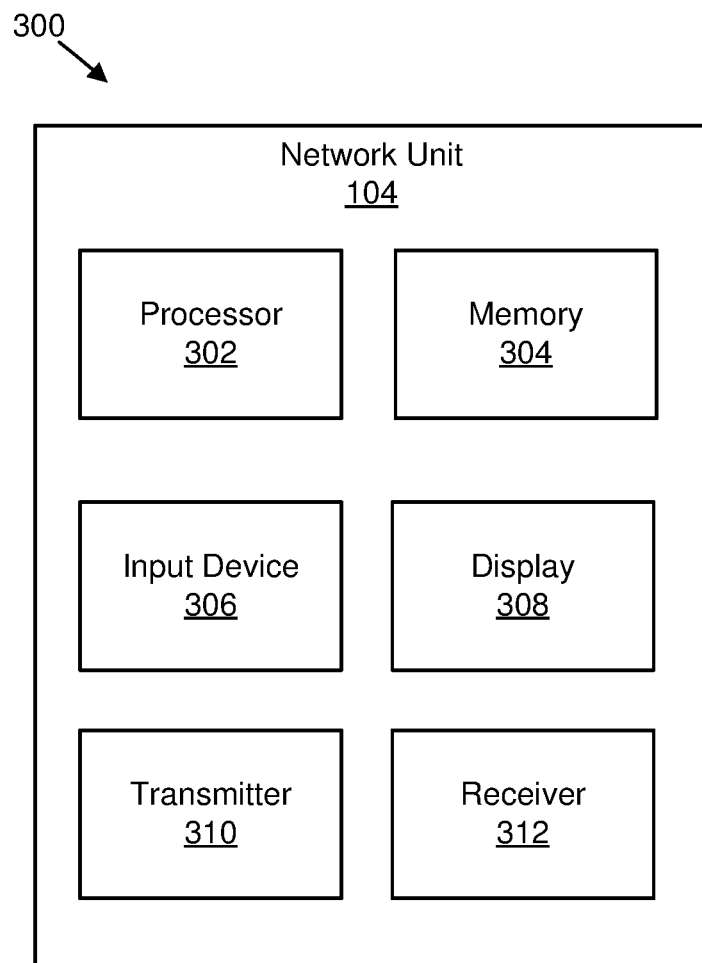
FIG. 3 is a schematic block diagram illustrating one embodiment of an apparatus that may be used for transmitting and/or receiving information and/or data.

FIG. 3 depicts one embodiment of an apparatus 300 that may be used for transmitting and/or receiving information and/or data. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

As may be appreciated, certain embodiments described herein may correspond to an NR system operating in the unlicensed spectrum, any of the embodiments described herein may apply to any system operating in a licensed or unlicensed spectrum.

In some embodiments, transmissions on an unlicensed medium, including transmission by a UE and a network, need to follow an LBT procedure for each of message individually and independently. Such embodiments may include RACH transmissions, downlink transmissions (e.g., PDSCH), and/or uplink transmissions (e.g., PUSCH). In various embodiments, a CCA and/or LBT procedure is performed before a transmission may be made on an unlicensed spectrum. In certain embodiments, there is only one transmission opportunity in a BWP and, if the CCA and/or LBT procedure is not successful, the transmission cannot be made thereby resulting in an increase in latency of a corresponding service.

Figure 4:
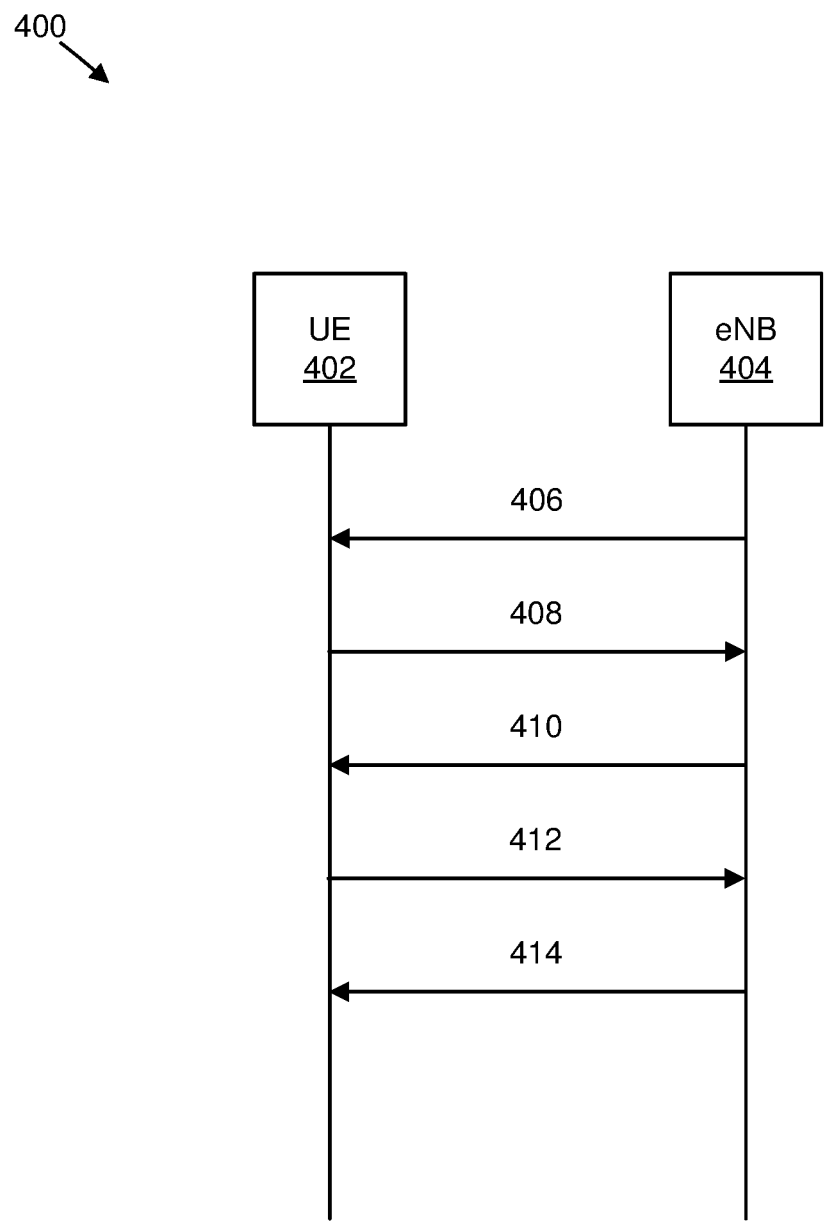
FIG. 4 is a schematic block diagram illustrating one embodiment of communications for a RACH procedure.

FIG. 4 is a schematic block diagram illustrating one embodiment of communications 400 for a RACH procedure. The communications 400 include communication between a UE 402 (or remote unit 102) and an eNB 404 (or network unit 104, gNB, etc.). Any of the communications described herein may include one or more messages.

In one embodiment, in a first communication 406 transmitted from the eNB 404 to the UE 402, the eNB 404 transmits one or more SIBs to the UE 402. In certain embodiments, in a second communication 408 transmitted from the UE 402 to the eNB 404, the UE 402 transmits a PRACH preamble (e.g., Msg1) to the eNB 404. In various embodiments, in a third communication 410 transmitted from the eNB 404 to the UE 402, the eNB 404 transmits a RAR (e.g., Msg2) to the UE 402. In some embodiments, in a fourth communication 412 transmitted from the UE 402 to the eNB 404, the UE 402 transmits a contention request (e.g., Msg3) to the eNB 404. In one embodiment, in a fifth communication 414 transmitted from the eNB 404 to the UE 402, the eNB 404 transmits a contention resolution (e.g., Msg4) to the UE 402.

In certain embodiments, as part of a CBRA procedure, a UE may perform LBT on multiple BWPs and whichever BWP succeeds, the UE sends PRACH. In various embodiments, for each serving cell a network configures at least an initial bandwidth part having at least a downlink bandwidth part and one (e.g., if the serving cell is configured with an uplink) or two (e.g., if the serving cell is using SUL) uplink bandwidth parts. In some embodiments, for each serving cell the network may configure up to 4 uplink bandwidth parts (and an additional 4 uplink bandwidth parts for Supplementary UL) and 4 downlink bandwidth parts for the serving cell.

In certain embodiments, only one configured BWP (e.g., for UL and DL) may be active at any point in time (or one BWP for UL and one BWP for DL) for each serving cell. In one embodiment, a UE performs LBT on all UL BWP that are configured with PRACH resources (e.g., for UL BWPs having rach-ConfigCommon configured, such as in the following example configuration: BWP-Uplink:= SEQUENCE{bwp-Id BWP-Id, bwp-Common BWP-UplinkCommon OPTIONAL, --Cond SetupOtherBWP bwp-Dedicated BWP-UplinkDedicated OPTIONAL, --Need M . . . }BWP-UplinkCommon:=SEQUENCE{generic-Parameters BWP, rach-ConfigCommon SetupRelease {RACH-ConfigCommon}OPTIONAL, --Need M pusch-ConfigCommon SetupRelease{PUSCH-ConfigCommon} OPTIONAL, --Need M pucch-ConfigCommon SetupRelease{PUCCH-ConfigCommon}OPTIONAL, --Need M . . . }.

In certain embodiments, if the CCA for a Msg1 transmission has succeeded for any BWP, the UE proceeds as follows: 1) if the successful BWP is the current active BWP, then the UE performs Msg1 transmission on the successful BWP; 2) if the successful BWP is not the current active BWP, then the UE autonomously changes the current active BWP to the successful BWP and performs Msg1 transmission on the successful BWP; 3) if there are multiple successful BWPs and the current active BWP is one of the multiple successful BWPs, then the UE chooses the current active BWP and performs Msg1 transmission on the current active BWP; and/or 4) if there are multiple successful BWPs and the current active BWP is not one of the multiple successful BWPs, then the UE chooses (e.g., randomly) one of the multiple successful BWPs as the current active BWP, autonomously changes the current active BWP to the chosen BWP, and performs Msg1 transmission on the chosen BWP.

In various embodiments, if there are multiple UL BWPs simultaneously (e.g., currently) active and if the CCA for a Msg1 transmission has succeeded for any of the multiple UL BWPs, the UE proceeds as follows: 1) if the successful BWP is one of the current active BWP, then the UE performs Msg1 transmission on the successful BWP; 2) if the successful BWP is not one of the current active BWPs, then the UE autonomously includes the successful BWP with the current active BWPs (e.g., adds the successful BWP to the current active BWPs, exchanges one of the current active BWPs with the successful BWP, or replaces one of the current active BWPs with the successful BWP), and performs Msg1 transmission on the successful BWP (as may be appreciated, at another time, such as after completion of the RACH procedure, a list of current active BWPs may be updated by the UE itself or by the network); 3) if there are multiple successful BWPs and at least one of the current active BWPs is among the multiple successful BWPs, then the UE chooses (e.g., randomly) one of the at least one of the current active BWPs that is among the multiple successful BWPs and performs Msg1 transmission on the chosen one of the at least one of the current active BWPs; and/or 4) if there are multiple successful BWPs but none are active, the UE chooses (e.g., randomly) one of the multiple successful BWPs, includes the chosen BWP in the list of current active BWPs, and performs Msg1 transmission on the chosen BWP.

In some embodiments, if there is a choice among two or more BWPs that might be used either as candidates to be included in a list of active BWPs or for Msg1 transmission, the following may be performed: choose one of the BWPs randomly; or choose the BWP for which a required transmission power (e.g., calculated according to 3gpp TS 38.321 v f20) is a minimum.

In certain embodiments, in a CFRA procedure, a gNB may order a UE to perform a RACH procedure by assigning PRACH resources including a PRACH preamble via DCI (e.g., a RACH order, a PDCCH order). In one embodiment, a gNB provides (e.g., signals) PRACH resources in multiple BWPs and the UE performs an LBT operation on the multiple BWPs. In some embodiments, DCI Format 1_0 may be used for a PDCCH order and there may be 10 reserved bits. In such embodiments, some of the reserved bits may be used to signal a bitmap for which each bit of the bitmap indicates a BWP-ID (e.g., the BWP-ID may come from BWPs configured at a UE by transmission of information to configure the BWPs in RRC signaling) in increasing order (e.g., a first bit of the bitmap corresponds to UL BWP-ID=1; a second bit of the bitmap corresponds to UL BWP-ID=2; and so forth). In various embodiments, more than one random access preamble index may be signaled if the same preamble may not be used on all the signaled BWPs. Such embodiments may be accomplished in a number of ways: first, including one or more random access preamble indexes as long as the size of DCI format allows; second, signaling only one random access preamble index, but using the bitmap in a way so that the random access preamble index may be transmitted on any UL BWP except those for which the corresponding bit in the bitmap is SET (e.g., equal to 1) (or alternatively not SET—equal to 0); third, using a different DCI format like a modified DCI Format 1_1; or, fourth, by using a new DCI format including the bitmap and the random access preamble indexes.

In various embodiments, only one configured BWP (e.g., for UL and DL) may be active at any point in time (or one BWP for UL and one BWP for DL) for each serving cell; therefore, a UE may consider a BWP to be active if the CCA (e.g., as a result of LBT performed on UL BWPs signaled in a PDCCH order) for the BWP is successful. In some embodiments in which there can be multiple active UL BWPs simultaneously: 1) if the BWP included in a PDCCH order for which there is a successful CCA (e.g., as a result of LBT performed on the UL BWPs signaled in the PDCCH order) is not among the multiple active UL BWPs, the UE may add the BWP to a list of current active BWPs; 2) if there are multiple BWPs included in a PDCCH order for which there is a successful CCA, then the UE may proceed as follows: choose one of the multiple BWPs randomly and initiate a Msg1 transmission using one of the randomly chosen BWPs; and/or choose a BWP of the multiple BWPs for which a required transmission power (e.g., calculated according to 3gpp TS 38.321 v f20) is a minimum. In certain embodiments, a chosen BWP is included in the list of current active BWPs and UE performs a PRACH Msg1 transmission on the chosen BWP. In such embodiments, the network may be prepared to receive the Msg1 transmission from the UE on all the UL BWP indicated in the PDCCH order.

In certain embodiments, in response to a PRACH transmission, a UE may attempt to detect a DCI format 1_0 with a CRC scrambled by RA-RNTI during a Msg2 window (e.g., a time period for which a Msg2 is expected to be received). In such embodiments, if a UE detects the DCI format 1_0 with the CRC scrambled by the corresponding RA-RNTI and a corresponding PDSCH that includes a DL-SCH transport block within the window, the UE passes the transport block to higher layers. The higher layers parse the transport block for a RAPID associated with the PRACH transmission. If the higher layers identify the RAPID in RAR messages of the DL-SCH transport block, the higher layers indicate an uplink grant to the physical layer. This is referred to as a RAR UL grant in the physical layer. In some embodiments, the Msg2 (e.g., RAR) may be sent by the network on any of the DL BWP that is "linked" to any of the UL BWP signaled in the PDCCH order. As may be appreciated, actual transmission of Msg2 may depend on which DL BWP is successful in CCA. The "linking" of corresponding UL and DL BWP may be by way of having the same BWP identity; or, the linking of corresponding UL and DL BWP may be accomplished in another way. In one embodiment, one UL BWP (e.g., BWP identity 1) is linked to multiple DL BWPs (e.g., to two DL BWPs with identities 1a and 1b) and the gNB may respond on any of these two DL BWPs (e.g., 1a, 1b) depending on success of CCA. The UE may be prepared to receive a response Msg2 on any of the two linked DL BWPs (e.g., 1a, 1b).

In one embodiment, a Msg2 may contain one or more grants for multiple UL BWPs to transmit Msg3, as indicated in Table 1.

TABLE 1

Additional Msg 2 Contents

| | |
|---|---|
| UL BWP-ID-1 | Grant for Msg3 transmission |
| UL BWP-ID-2 | Grant for Msg3 transmission |

TABLE 2

RAR With BWP-ID

| | | | | |
|---|---|---|---|---|
| R | R | E = 1 | | Timing Advance Command |
| Timing Advance Command | | | | UL Grant |
| | | | UL Grant | |
| | | | UL Grant | |
| | | | UL Grant | |
| BWP-ID | | E = 1 | | UL Grant |
| | | | UL Grant | |
| | | | UL Grant | |
| UL Grant | | BWP-ID | E = 0 | R |
| Temporary C-RNTI | | | | |
| Temporary C-RNTI | | | | |

TABLE 3

RAR With BITMAP

| | | | | |
|---|---|---|---|---|
| R | R | B | | Timing Advance Command |
| Timing Advance Command | | | | BITMAP |
| BITMAP | | | | UL Grant-1 |
| | | | UL Grant-1 | |
| | | | UL Grant-1 | |

TABLE 3-continued

RAR With BITMAP

| | |
|---|---|
| UL Grant-1 | UL Grant-2 |
| UL Grant-2 | |
| UL Grant-2 | |
| UL Grant-2 | R   R   R |
| | Temporary C-RNTI |
| | Temporary C-RNTI |

In certain embodiments, as illustrated in Table 2, a RAR may include BWP-IDs for which an UL grant is provided for transmission of Msg3 (e.g., PUSCH). As illustrated, a field 'E' may be an extension field that indicates if another pair of BWP-ID and 'E' are present. In various embodiments, as illustrated in Table 3, a bitmap may be used for which each bit of the bitmap indicates a BWP-ID in increasing order (e.g., a first bit of the bitmap corresponds to UL BWP-ID=1; a second bit of the bitmap corresponds to UL BWP-ID=2; and so forth). As illustrated, a field 'B may be a field that indicates if a bitmap is present. In such embodiments, depending on a number of bits SET in the bitmap, a UE may know how many UL grants (e.g., each of size 25 bits) to expect. As illustrated, in Table 2, the remaining bits in the last octets prior to the temporary C-RNTI octets are padded with reserved or null values (shown as 'It' for illustration).

In certain embodiments that use Table 1, Table 2, and/or Table 3, a UE may further perform LBT on multiple UL BWPs and transmit Msg3 (e.g., PUSCH) on a BWP for which CCA succeeds.

In one embodiment, retransmission of Msg3 is granted using DCI format 0_0 with CRC scrambled by TC-RNTI. In such an embodiment, diversity may be increased by including resources for retransmission on different BWPs in the DCI format 0_0, in the format 0_1, or in a newly designing DCI format so that the scheduling information for more than one BWP may be included. As may be appreciated, the following information may need to be included separately for each BWP: a frequency domain resource assignment; a time domain resource assignment; and/or a bandwidth part indicator. In various embodiments, the bandwidth part indicators may be signaled using a bitmap as described herein. In certain embodiments, information such as the following may be common among BWPs signaled in DCI: a new data indicator; a redundancy version; and/or a HARQ process number.

In some embodiments, such as for handover, a network may allocate PRACH resources to more than one UL BWP in a handover command if the UE can perform the RACH procedure to send the handover complete using an RRC message accordingly to various embodiments described herein.

In one embodiment, for any PUSCH (e.g., not only RACH msg3) a gNB may allocate a PUSCH resource for one TB on multiple BWPs (e.g., via a single DCI) and the UE transmits on one or more BWPs of the multiple BWPs for which CCA is successful. The selection of a PUSCH resource of a BWP from indicated multiple BWPs for the transmission of one TB may be accomplished in a similar way to other embodiments described herein.

In certain embodiments, some of the BWPs included for diversity purpose in the embodiments described herein may belong to a different cell than the cell in which RAR and/or DCI is received.

In various embodiments, there may be multiple active BWPs on which PUSCH is scheduled by RAR transmission. In such embodiments, PUSCH transmission takes place on a preconfigured BWP; PUSCH transmission takes place on a linked UL BWP of a DL BWP for which RAR was received; and/or a single BWP ID field is included in RAR Msg2 to indicate an UL BWP for PUSCH transmission. In some embodiments, such as for unlicensed access, an LBT procedure and/or CCA is performed on an UL BWP for which PUSCH is scheduled. In various embodiments, such as for licensed access, an LBT procedure and/or CCA is not performed on an UL BWP for which PUSCH is scheduled.

In certain embodiments, there may be multiple active BWPs on which PUSCH is scheduled by DCI grants addressed to Temporary C-RNTI or to C-RNTI In such embodiments, PUSCH transmission takes place on a pre-configured BWP; PUSCH transmission takes place on a linked UL BWP of a DL BWP for which DCI was received; and/or a single BWP ID field is included in the DCI to indicate an UL BWP for PUSCH transmission. In some embodiments, such as for unlicensed access, an LBT procedure and/or CCA is performed on an UL BWP for which PUSCH is scheduled. In various embodiments, such as for licensed access, an LBT procedure and/or CCA is not performed on an UL BWP for which PUSCH is scheduled.

Figure 5:
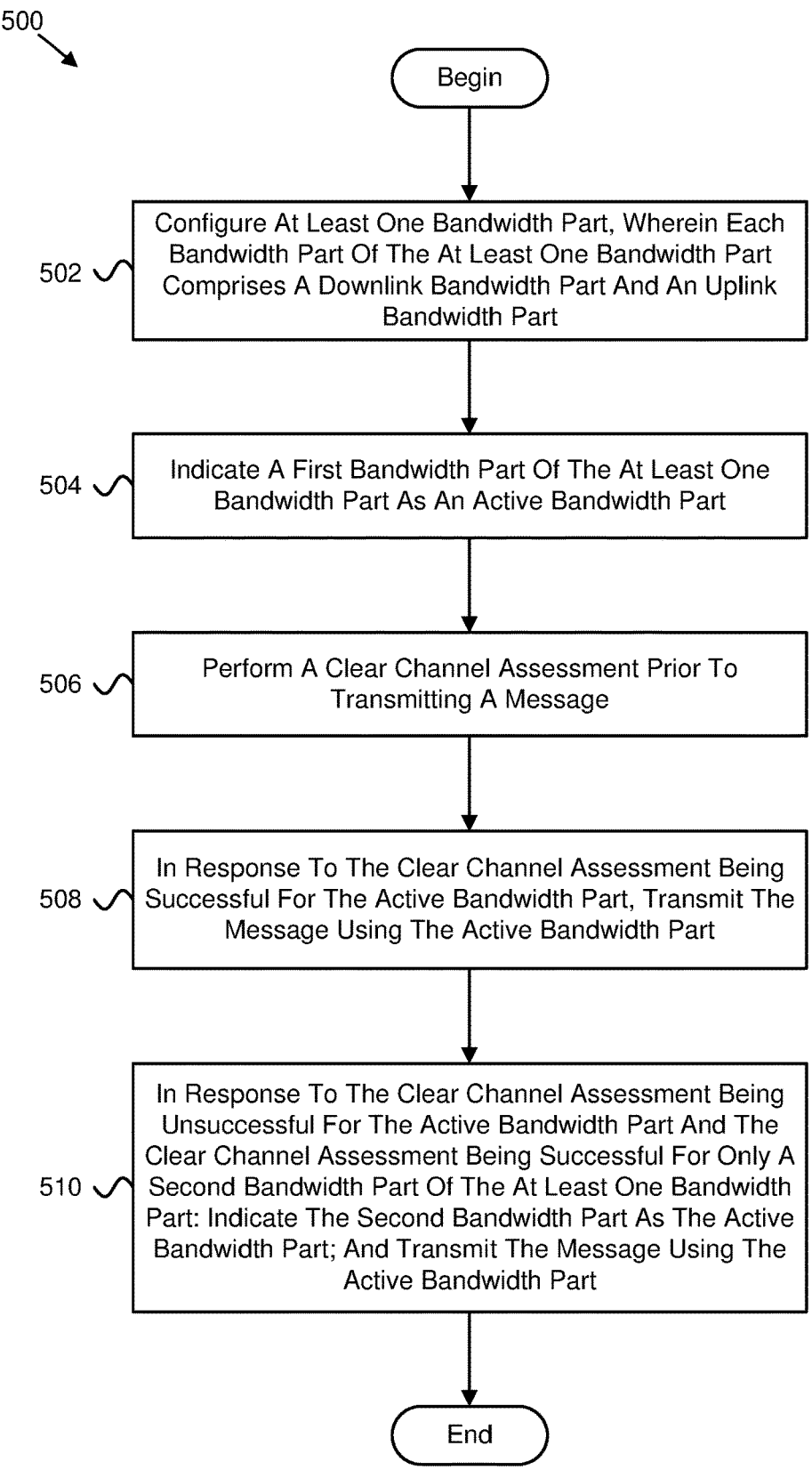
FIG. 5 is a flow chart diagram illustrating one embodiment of a method for bandwidth part configuration based on a clear channel assessment.

FIG. 5 is a flow chart diagram illustrating one embodiment of a method 500 for bandwidth part configuration based on a clear channel assessment. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include configuring 502 at least one bandwidth part. In such an embodiment, each bandwidth part of the at least one bandwidth part comprises a downlink bandwidth part and an uplink bandwidth part. In certain embodiments, the method 500 includes indicating 504 a first bandwidth part of the at least one bandwidth part as an active bandwidth part. In various embodiments, the method 500 includes performing 506 a clear channel assessment prior to transmitting a message. In some embodiments, the method 500 includes, in response to the clear channel assessment being successful for the active bandwidth part, transmitting 508 the message using the active bandwidth part. In certain embodiments, the method 500 includes, in response to the clear channel assessment being unsuccessful for the active bandwidth part and the clear channel assessment being successful for only a second bandwidth part of the at least one bandwidth part: indicating 510 the second bandwidth part as the active bandwidth part; and transmitting the message using the active bandwidth part.

In certain embodiments, the method 500 further comprises, in response to the clear channel assessment being unsuccessful for the active bandwidth part and the clear channel assessment being successful for a plurality of bandwidth parts of the at least one bandwidth part: selecting a third bandwidth part of the plurality of bandwidth parts as the active bandwidth part; and transmitting the message using the active bandwidth part. In some embodiments, selecting the third bandwidth part as the active bandwidth part comprises randomly selecting a bandwidth part of the plurality of bandwidth parts as the active bandwidth part. In various embodiments, selecting the third bandwidth part as the active bandwidth part comprises selecting a bandwidth part of the plurality of bandwidth parts having a lowest required transmission power.

In one embodiment, the message comprises a random access procedure message 1. In certain embodiments, each bandwidth part of the at least one bandwidth part comprises the downlink bandwidth part and a plurality of uplink bandwidth parts. In some embodiments, the active bandwidth part comprises the downlink bandwidth part and a plurality of uplink bandwidth parts.

In various embodiments, the method 500 further comprises receiving information indicating a random access channel preamble to transmit in the message. In one embodiment, the method 500 further comprises receiving information indicating a set of bandwidth parts of the at least one bandwidth part for performing the clear channel assessment. In certain embodiments, the information comprises a bitmap with each bit of the bitmap corresponding to a bandwidth part of the set of bandwidth parts.

In some embodiments, the method 500 further comprises receiving a response to transmission of the message. In various embodiments, the response is received on a linked downlink bandwidth part corresponding to the active bandwidth part. In one embodiment, the response is received on one of a plurality of linked downlink bandwidth parts corresponding to the active bandwidth part. In certain embodiments, the response comprises one or more grants for a plurality of uplink bandwidth parts to transmit a random access channel message 3.

In one embodiment, a method comprises: configuring at least one bandwidth part, wherein each bandwidth part of the at least one bandwidth part comprises a downlink bandwidth part and an uplink bandwidth part; indicating a first bandwidth part of the at least one bandwidth part as an active bandwidth part; performing a clear channel assessment prior to transmitting a message; in response to the clear channel assessment being successful for the active bandwidth part, transmitting the message using the active bandwidth part; and in response to the clear channel assessment being unsuccessful for the active bandwidth part and the clear channel assessment being successful for only a second bandwidth part of the at least one bandwidth part: indicating the second bandwidth part as the active bandwidth part; and transmitting the message using the active bandwidth part.

In certain embodiments, the method further comprises, in response to the clear channel assessment being unsuccessful for the active bandwidth part and the clear channel assessment being successful for a plurality of bandwidth parts of the at least one bandwidth part: selecting a third bandwidth part of the plurality of bandwidth parts as the active bandwidth part; and transmitting the message using the active bandwidth part.

In some embodiments, selecting the third bandwidth part as the active bandwidth part comprises randomly selecting a bandwidth part of the plurality of bandwidth parts as the active bandwidth part.

In various embodiments, selecting the third bandwidth part as the active bandwidth part comprises selecting a bandwidth part of the plurality of bandwidth parts having a lowest required transmission power.

In one embodiment, the message comprises a random access procedure message 1.

In certain embodiments, each bandwidth part of the at least one bandwidth part comprises the downlink bandwidth part and a plurality of uplink bandwidth parts.

In some embodiments, the active bandwidth part comprises the downlink bandwidth part and a plurality of uplink bandwidth parts.

In various embodiments, the method further comprises receiving information indicating a random access channel preamble to transmit in the message.

In one embodiment, the method further comprises receiving information indicating a set of bandwidth parts of the at least one bandwidth part for performing the clear channel assessment.

In certain embodiments, the information comprises a bitmap with each bit of the bitmap corresponding to a bandwidth part of the set of bandwidth parts.

In some embodiments, the method further comprises receiving a response to transmission of the message.

In various embodiments, the response is received on a linked downlink bandwidth part corresponding to the active bandwidth part.

In one embodiment, the response is received on one of a plurality of linked downlink bandwidth parts corresponding to the active bandwidth part.

In certain embodiments, the response comprises one or more grants for a plurality of uplink bandwidth parts to transmit a random access channel message 3.

In one embodiment, an apparatus comprises: a processor that: configures at least one bandwidth part, wherein each bandwidth part of the at least one bandwidth part comprises a downlink bandwidth part and an uplink bandwidth part; indicates a first bandwidth part of the at least one bandwidth part as an active bandwidth part; and performs a clear channel assessment prior to transmitting a message; a transmitter that, in response to the clear channel assessment being successful for the active bandwidth part, transmits the message using the active bandwidth part; wherein, in response to the clear channel assessment being unsuccessful for the active bandwidth part and the clear channel assessment being successful for only a second bandwidth part of the at least one bandwidth part: the processor indicates the second bandwidth part as the active bandwidth part; and the transmitter transmits the message using the active bandwidth part.

In certain embodiments, in response to the clear channel assessment being unsuccessful for the active bandwidth part and the clear channel assessment being successful for a plurality of bandwidth parts of the at least one bandwidth part: the processor selects a third bandwidth part of the plurality of bandwidth parts as the active bandwidth part; and the transmitter transmits the message using the active bandwidth part.

In some embodiments, the processor selecting the third bandwidth part as the active bandwidth part comprises the processor randomly selecting a bandwidth part of the plurality of bandwidth parts as the active bandwidth part.

In various embodiments, the processor selecting the third bandwidth part as the active bandwidth part comprises the processor selecting a bandwidth part of the plurality of bandwidth parts having a lowest required transmission power.

In one embodiment, the message comprises a random access procedure message 1.

In certain embodiments, each bandwidth part of the at least one bandwidth part comprises the downlink bandwidth part and a plurality of uplink bandwidth parts.

In some embodiments, the active bandwidth part comprises the downlink bandwidth part and a plurality of uplink bandwidth parts.

In various embodiments, the apparatus further comprises a receiver that receives information indicating a random access channel preamble to transmit in the message.

In one embodiment, the apparatus further comprises a receiver that receives information indicating a set of bandwidth parts of the at least one bandwidth part for performing the clear channel assessment.

In certain embodiments, the information comprises a bitmap with each bit of the bitmap corresponding to a bandwidth part of the set of bandwidth parts.

In some embodiments, the apparatus further comprises a receiver that receives a response to transmission of the message.

In various embodiments, the response is received on a linked downlink bandwidth part corresponding to the active bandwidth part.

In one embodiment, the response is received on one of a plurality of linked downlink bandwidth parts corresponding to the active bandwidth part.

In certain embodiments, the response comprises one or more grants for a plurality of uplink bandwidth parts to transmit a random access channel message 3.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
configuring at least one bandwidth part, wherein each bandwidth part of the at least one bandwidth part comprises a downlink bandwidth part and an uplink bandwidth part;
indicating a first bandwidth part of the at least one bandwidth part as an active bandwidth part;
performing a clear channel assessment on the active bandwidth part prior to transmitting a message;
in response to the clear channel assessment being successful for the active bandwidth part, transmitting the message using the active bandwidth part; and
in response to the clear channel assessment being unsuccessful for the active bandwidth part:
performing a clear channel assessment on a plurality of bandwidth parts of the at least one bandwidth part other than the active bandwidth part; and
in response to the clear channel assessment being successful for only a second bandwidth part of the plurality of bandwidth parts on which the clear channel assessment is performed:
indicating the second bandwidth part as the active bandwidth part; and
transmitting the message using the active bandwidth part.

2. The method of claim 1, further comprising, in response to the clear channel assessment being unsuccessful for the active bandwidth part and the clear channel assessment being successful for a plurality of bandwidth parts of the at least one bandwidth part:
selecting a third bandwidth part of the plurality of bandwidth parts as the active bandwidth part; and
transmitting the message using the active bandwidth part.

3. The method of claim 2, wherein selecting the third bandwidth part as the active bandwidth part comprises randomly selecting a bandwidth part of the plurality of bandwidth parts as the active bandwidth part.

4. The method of claim 2, wherein selecting the third bandwidth part as the active bandwidth part comprises selecting a bandwidth part of the plurality of bandwidth parts having a lowest required transmission power.

5. The method of claim 1, wherein the message comprises a random access procedure message 1.

6. The method of claim 1, wherein each bandwidth part of the at least one bandwidth part comprises the downlink bandwidth part and a plurality of uplink bandwidth parts.

7. The method of claim 1, wherein the active bandwidth part comprises the downlink bandwidth part and a plurality of uplink bandwidth parts.

8. The method of claim 1, further comprising receiving information indicating a random access channel preamble to transmit in the message.

9. The method of claim 1, further comprising receiving information indicating a set of bandwidth parts of the at least one bandwidth part for performing the clear channel assessment.

10. The method of claim 9, wherein the information comprises a bitmap with each bit of the bitmap corresponding to a bandwidth part of the set of bandwidth parts.

11. The method of claim 1, further comprising receiving a response to transmission of the message.

12. The method of claim 11, wherein the response is received on a linked downlink bandwidth part corresponding to the active bandwidth part.

13. The method of claim 11, wherein the response is received on one of a plurality of linked downlink bandwidth parts corresponding to the active bandwidth part.

14. The method of claim 11, wherein the response comprises one or more grants for a plurality of uplink bandwidth parts to transmit a random access channel message 3.

15. An apparatus comprising:
a processor that:
configures at least one bandwidth part, wherein each bandwidth part of the at least one bandwidth part comprises a downlink bandwidth part and an uplink bandwidth part;
indicates a first bandwidth part of the at least one bandwidth part as an active bandwidth part; and
performs a clear channel assessment on the active bandwidth part prior to transmitting a message;
a transmitter that, in response to the clear channel assessment being successful for the active bandwidth part, transmits the message using the active bandwidth part;
wherein, in response to the clear channel assessment being unsuccessful for the active bandwidth part:
the processor performs a clear channel assessment on a plurality of bandwidth parts of the at least one bandwidth part other than the active bandwidth part; and
in response to the clear channel assessment being successful for only a second bandwidth part of the plurality of bandwidth parts on which the clear channel assessment is performed:
the processor indicates the second bandwidth part as the active bandwidth part; and
the transmitter transmits the message using the active bandwidth part.

16. The apparatus of claim 15, wherein the processor selects a third bandwidth part as the active bandwidth part by randomly selecting a bandwidth part of the plurality of bandwidth parts as the active bandwidth part.

17. The apparatus of claim 15, wherein the processor selects a third bandwidth part as the active bandwidth part by selecting a bandwidth part of the plurality of bandwidth parts having a lowest required transmission power.

18. The apparatus of claim 15, further comprising a receiver that receives information indicating a random access channel preamble to transmit in the message.

19. The apparatus of claim 15, further comprising a receiver that receives information indicating a set of bandwidth parts of the at least one bandwidth part for performing the clear channel assessment.

20. The apparatus of claim 15, further comprising a receiver that receives a response to transmission of the message.

* * * * *